United States Patent
Aigouy et al.

(10) Patent No.: US 9,389,006 B2
(45) Date of Patent: Jul. 12, 2016

(54) REFRIGERATION METHOD AND APPARATUS WITH A PULSATING LOAD

(75) Inventors: Gerald Aigouy, La Croix de la Rochette (FR); Pierre Briend, Seyssinet (FR); Cindy Deschildre, Sassenage (FR); Eric Fauve, Bollene (FR); Jean-Marc Bernhardt, La Buisse (FR); Franck Delcayre, Rives sur Fure (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 845 days.

(21) Appl. No.: 13/636,539

(22) PCT Filed: Feb. 28, 2011

(86) PCT No.: PCT/FR2011/050408
§ 371 (c)(1),
(2), (4) Date: Sep. 21, 2012

(87) PCT Pub. No.: WO2011/117499
PCT Pub. Date: Sep. 29, 2011

(65) Prior Publication Data
US 2013/0014518 A1     Jan. 17, 2013

(30) Foreign Application Priority Data
Mar. 23, 2010   (FR) .................................. 10 52072

(51) Int. Cl.
*F25B 9/00*      (2006.01)
*H01F 6/04*      (2006.01)
(Continued)

(52) U.S. Cl.
CPC ... *F25B 9/00* (2013.01); *H01F 6/04* (2013.01); *H02K 9/10* (2013.01); *H02K 55/00* (2013.01)

(58) Field of Classification Search
CPC ............... F25B 9/00; F25B 9/06; F25B 9/14; F25B 2400/24; H01F 6/04; F02K 9/00; F02K 9/01; F02K 55/00
See application file for complete search history.

(56) References Cited

U.S. PATENT DOCUMENTS 4,884,409 A * 12/1989 Quack ...................... H01F 6/04
                                                174/15.4

FOREIGN PATENT DOCUMENTS

WO   WO 2009/024705    2/2009
WO   WO 2010/109091    9/2010

OTHER PUBLICATIONS

Dauget et al., "Using Dynamic Simulation to Support Helium Refrigerator Process Engineering", 100 Years of Liquid Helium: Proceeedings of the Twenty-Second International Cryogenic Engineering Conference and International Cryogenic Materials Conference 2008, ICEC 22—ICMC 2008; Seoul, Korea; Jul. 21-25, 2008, KR, Jan. 1, 2009, pp. 39-44.*

(Continued)

Primary Examiner — Jonathan Bradford
(74) Attorney, Agent, or Firm — Christopher J. Cronin (57) ABSTRACT

A method for the pulsating load refrigeration of a component of a Tokamak using a refrigeration device subjecting a working fluid to a working cycle. At least one "periodic and symmetrical" operating mode of the Tokamak includes an operating mode in which plasmas of preset duration Dp are generated periodically with intervals of duration Dnp between two successive plasmas. Dnp=Dp±30%. The cooling device cooling power is increased to a relatively high level in a plasma generation phase and reduced to a relatively low level when the Tokamak is no longer in a plasma generation phase. The refrigerating power variation brings gradual increases and reductions in refrigerating power. The increase in the refrigeration device refrigerating power is triggered in advance, in response to a signal (S) generated during a plasma starting step before the thermal load on the component increases.

16 Claims, 2 Drawing Sheets

(51) Int. Cl.
 H02K 55/00 (2006.01)
 H02K 9/10 (2006.01)

(56) References Cited

OTHER PUBLICATIONS

International Search Report for PCT/FR2011/050408, mailed Apr. 29, 2011.
French Search Report and Written Opinion for FR 10 52072, mailed Nov. 22, 2010.
Dauguet, et al., "Using Dynamic Simulation to Support Helium Refrigerator Process Engineering," 100 Years of Liquid Helium: Proceedings of the Twenty-Second International Cryogenic Engineering Conference and International Cryogenic Materials Conference 2008, ICEC 22—ICMC 2008; Seoul, Korea, Jul. 21-25, 2008, KR, Jan. 1, 2009, pp. 39-44.
Kalinin, et al., "ITER Cryogenic System," Fusion Engineering and Design, Elsevier Science Publishers, Amsterdam, NL LNKD-DOI:10.1016/J.Fusengdes.2006.07.003, vol. 81, No. 23-24, Nov. 1, 2006, pp. 2589-2595.
Briend, et al., "Dynamic Simulation of a Large Scale and Pulsed Load Helium Refrigerator," Internet Citation, URL: http://www.sainc.com/cec-icmc09/techindiv.asp?paperNumber=C3-N-02, Jul. 1, 2009, 1 page.
Briend, et al., "Dynamic Simulation of a Large Scale Pulsed Load Helium Refrigerator," Advances in Cryogenic Engineering: Transactions of the Cryogenic Engineering Conference—CEC, American Institute of Physics, US, vol. 55, Apr. 9, 2010, pp. 1453-1459.
Claudet, et al, "Design of the ITER-FEAT Cryoplant to Achieve Stable Operation Over a Wide Range of Experimental Parameters and Operation Scenarios," Fusion Engineering and Design, Elsevier Science Publishers, Amsterdam, NL LNKD-DOI:10.1016/S0920-3796(01)00434-3, vol. 58-59, Nov. 1, 2001, pp. 205-209.
Deschildre, et al., "Dynamic Simulation of an Helium Refrigerator," Advances in Cryogenic Engineering: Transactions of the Cryogenic Engineering Conference—CEC, AIP, US, vol. 53, Mar. 16, 2008, pp. 475-482.

* cited by examiner

REFRIGERATION METHOD AND APPARATUS WITH A PULSATING LOAD

CROSS-REFERENCE TO RELATED APPLICATIONS

This application is a §371 of International PCT Application PCT/FR2011/050408, filed Feb. 28, 2011, which claims §119 (a) foreign priority to French patent application 1052072, filed Mar. 23, 2010.

BACKGROUND

1. Field of the Invention

The present invention relates to a pulsed load cooling method and refrigerator.

The invention more particularly relates to a pulsed load method for cooling a component of a "Tokamak", i.e. a component of an installation for intermittently generating a plasma, the method employing a cooling device that subjects a working fluid such as helium to a working cycle comprising: compression; cooling and expansion; heat exchange with the component; and heating, the Tokamak comprising at least one operating mode called a "periodic and symmetric" operating mode, i.e. an operating mode in which plasmas of preset duration Dp are generated periodically with intervals of duration Dnp between two successive plasmas, the duration of the intervals being at most 30% different to the duration Dp of the plasmas (Dnp=Dp±30%), according to the method the cooling power produced by the cooling device is increased to a relatively high level when the Tokamak is in a plasma generation phase whereas the cooling power produced by the cooling device is reduced to a relatively low level when the Tokamak is no longer in a plasma generation phase.

The invention more particularly relates to a pulsed load cooling method and refrigerator for cooling a component of a Tokamak, i.e. a component of an installation for intermittently generating a plasma.

2. Related Art

A Tokamak (Russian acronym for "Toroidalnaya Kamera c Magnitnymi Katushkami") is an installation capable of producing the physical conditions necessary for obtaining power from fusion. In particular, a Tokamak intermittently produces plasma, i.e. ionized gas that conducts electricity.

The cooling requirements of Tokamaks depend on their highly transitory operating state. A Tokamak produces plasma in discontinuous, repeated bursts. The plasmas are generated cyclically at regular intervals or else randomly, on request.

This operating mode requires what is called pulsed load cooling, i.e. very substantial cooling power is required for a very short amount of time (during the plasma generation phase), this high cooling demand being followed by a longer period (until the next plasma is generated) during which there is little need for cooling.

Tokamak refrigerators are therefore designed to meet the requirements of this operating mode. Thus, these refrigerators employ what is called an "economizer" mode, producing liquid helium in the periods between plasmas. The liquid helium produced is stored in a reserve that will be consumed by boiling to cool a component of the Tokamak during plasma generation phases.

When the period between two plasmas is sufficiently long, the maximum filling level of the liquid helium reserve is reached before the following plasma. The cooling power of the refrigerator may then be reduced, thereby saving a substantial amount of power. In a conventional solution, the power of the refrigerator is minimized by reducing the pressure of the cycle (i.e. by reducing the pressure level of the compression of the helium in its working cycle). The power of the refrigerator may also be decreased or increased by changing the cycle flow rate when a frequency variator is used (i.e. the flow rate of helium through the working cycle is selectively decreased or increased).

A heater is generally provided in the liquid helium reserve. This heater is activated in order to consume excess cooling power, so as to keep the liquid level constant or at least below a maximum threshold.

Conventionally, when a new plasma is generated, the refrigerator is made to produce a maximum cooling power either manually (by an operator), or as a function of the "heating curve" of the heater.

When the plasma has been extinguished and the cooling power required is lower, the return of the refrigerator to a regime producing less cooling power is generally achieved automatically, when no power is being supplied to the heater.

Although this operating mode is satisfactory overall, the power consumption of the refrigerator remains high.

Certain Tokamaks operate by repeatedly, periodically and cyclically generating plasmas the periodic profile of which approximates to a sinusoidal mode, i.e. the plasma phases and the plasma-less phases follow one another periodically with identical or substantially identical durations.

Although the plasma is generated in on/off mode, the thermal load (i.e. the cooling requirement) seen by the refrigerator resembles a sinusoidal wave.

Conventionally, the power of a refrigerator is regulated by matching the pressures and flow rates of the working cycle of the working fluid (helium for example) to the cooling requirements.

For the sake of simplicity, this working fluid is called "helium" in the rest of the description. Of course, this working fluid is not limited to this gas alone but may comprise any appropriate gas or gas mixture.

The working cycle of a high-cooling-power refrigerator very often comprises three cycle pressure levels: a high pressure (HP), an intermediate pressure (MP) and a low pressure (BP). Sometimes, when required, the helium is subjected to other additional pressure levels. For example, the working cycle may comprise a stage in which the helium is subjected to a subatmospheric pressure (LP).

The method and the device according to the invention are however not limited to a particular number of pressure stages.

The high-pressure helium HP is fed to systems in which a substantial degree of expansion occurs, such as for example Brayton turbines, cold turbines or Joule-Thomson valves.

The intermediate pressure MP helium is generally needed to limit the power of the Brayton turbines, which are not always technically capable of completely expanding the helium between the high pressure HP and low pressure BP levels.

There may then be a limited expansion between the high pressure HP and intermediate pressure MP levels. The presence of an intermediate pressure MP level may moreover have the benefit of increasing the efficiency of the compressors, by staging the helium compression.

Optimized pressure stages are widely designed using the theoretical value $MP=\sqrt{BP \times HP}$. The low pressure BP corresponds for its part to the saturation pressure of the helium and to the inlet pressure of the compressors. When the required helium temperature is below 4.3 K, the saturation pressure is subatmospheric (LP), and an additional compression stage is then necessary between the subatmospheric pressure LP and the low pressure BP.

The inventors have observed that regulating the power of the refrigerator so as to properly meet the cooling requirements of the Tokamak is difficult and requires a lot of effort on the part of the operators. In particular, controlling for the regularity of the thermal load of the Tokamak is relatively difficult. If the power of the refrigerator is poorly regulated, the inventors have observed that the liquid helium level in the buffer may constantly be increasing or decreasing from one cycle to another. As a result it is necessary to interrupt the sequence of plasma generation in order to allow the liquid helium level in the buffer tank to return to its initial state, or to a given fill level, in an attempt to keep this level between the maximum and minimum thresholds for as long as possible—this being necessary for safe operation of the installation.

The article "Using Dynamic Simulation to support Helium Refrigerator Process Engineering" Proceedings of ICEC 22-ICMC 2008, pages 39-44, by Dauguet P.; Briend P.; Deschildre C. and Sequeira S. E., describes a cooling method in which the cooling device is controlled so as to keep the working cycle pressures constant and also so as to keep the electrical power consumed by the cooling device constant.

SUMMARY OF THE INVENTION

One aim of the present invention is to mitigate all or some of the drawbacks of the prior art touched upon above. In particular, the aim of the present invention is to provide a cooling method and a refrigerator that are better than those of the prior art.

To this end, the method according to the invention, and moreover according to the generic definition thereof given above in the preamble is essentially characterized in that during the "periodic and symmetric" operating phase of the Tokamak the cooling power of the cooling device is regulated using forced "periodic and symmetric" control, i.e. the durations of respective phases spent generating a high cooling level and generating a low level of cooling power differ by 30% at most, and in that the cooling power is varied so as to produce progressive increases and decreases in the cooling power, and in that the increase in the cooling power produced by the cooling device is triggered in anticipation of a plasma, in response to a signal produced during a step of starting said plasma in the Tokamak, i.e. before the thermal load on the component increases.

Moreover, embodiments of the invention may comprise one or more of the following features:
the working cycle comprises stages in which the working fluid is respectively subjected to a high pressure, an intermediate pressure, and a low pressure during the periodic and symmetric operating phase of the Tokamak, at least one of: the high pressure level; and the intermediate pressure level being regulated using forced "periodic and symmetric" control, i.e. the amplitude of the pressure is regulated between respective higher and lower values for respective durations that differ by 30% at most;
the high pressure level and/or the intermediate pressure level are/is regulated by modulating the amplitude of the pressure about a respective preset average pressure value;
the modulation of the amplitude of the pressure is carried out automatically by electronic logic implementing at least one of: proportional integral derivative (PID) closed loop control;
the modulation of the amplitude of the pressure is carried out automatically by electronic logic implementing at least one of:
proportional integral derivative (PID) closed loop control;
iterative control via an adaptive control law such as a least mean square (LMS) law or linear quadratic regulator (LQR) control;
iterative control via an adaptive control law such as a least mean square (LMS) law; and
linear quadratic regulator (LQR) control;
the method comprises at least one period during which the cooling device liquefies the working fluid and stores the liquefied fluid in a buffer reserve with a view to using it to release cooling power during a plasma phase, the high pressure level and/or the intermediate pressure and/or low pressure level being regulated as a function of the liquid level measured in the buffer reserve and/or as a function of the average value of this liquid level;
the high pressure level and/or the intermediate pressure and/or low pressure level are/is regulated as a function of the root mean square (RMS) value of the liquid level measured in the buffer reserve;
the high pressure level and/or the intermediate pressure level and/or low pressure level are/is regulated as a function of the maximum measured value of the liquid level in the buffer reserve;
the cooling power of the cooling device is regulated so as, on the one hand, to consume, during a plasma phase, the liquid in the buffer reserve, starting from a preset initial liquid level and, on the other hand, to restore to the reserve said initial liquid level between plasma phases;
the cooling power of the cooling device is regulated so as to keep the average value of the liquid level in the reserve constant;
the periodic and symmetric operating mode of the Tokamak applies a harmonic thermal load to the component;
the cooling power of the cooling device is regulated using a harmonic forced control;
the Tokamak generates plasmas with a preset duration Dp, the duration Dnp of the intervals between two successive plasma being between 80% and 120% of the duration Dp of the plasmas (Dnp=Dp±20%) and preferably the duration Dnp of the intervals between two successive plasmas being between 90% and 110% of the duration Dp of the plasmas (Dnp=Dp±10%);
the respective times spent, on the one hand, generating a high level of cooling and, on the other hand, generating a low level of cooling power differ by 20% at most, and preferably 10% at most;
the signal is generated when there is a preset modification of a physical parameter that can be observed in the Tokamak;
the signal is generated when there is a preset modification of at least one of the following physical parameters: a preset increase in the internal temperature of the Tokamak; a manual or automatic control signal for switching the Tokamak to a plasma generation phase; an electrical signal associated with a pressure and/or electrical current and/or voltage and/or magnetic field measurement; or a signal delivered by an optical measuring instrument such as a camera or one or more optical fibers;
at least some of the cooling power produced by the refrigerator in excess of the thermal load is selectively regulated via a heater that vaporizes the excess liquid helium produced and/or via a cold bypass system that selectively returns part of the helium output by the cooling unit to the compressing station;
the decrease in the cooling power produced by the cooling device to a low level is automatically triggered in response to a preset variation in the thermal load on the component, i.e. a preset variation in the cooling requirement of the component; and the decrease in the cooling power produced by the cooling device is automatically triggered in response to at least one of: a signal indicating a preset temperature decrease in a fluid circuit ensuring heat exchange between the component and the working fluid; an increase in the liquid helium level in a storage tank; an opening threshold of a cold bypass; and/or a threshold speed of a cold compressor or turbine.

The invention may thus consist in forcibly varying the high pressure HP, intermediate pressure MP and optionally the low pressure BP and/or LP levels of the working cycle periodically and symmetrically, for example harmonically or in a periodic way that is close to a harmonic variation.

The invention thus allows the refrigerator to be regulated not with instantaneous observables, but with observables suited to the harmonic regime, such as:

average values of the liquid helium level measured in the buffer reserve and/or;

the root mean square (RMS) average of the liquid helium level measured in the buffer reserve;

the maximum value of the liquid helium level measured in the buffer reserve,

The pressures (MP and/or HP and/or BP) of the working cycle may then be regulated by amplitude modulation around respective average values, as a function of the root mean square (RMS) value of the level. This solution guarantees that, between each plasma generation cycle, the liquid helium level in the buffer tank returns to its initial state and the average value of this liquid level stays constant. This has the advantage of allowing the refrigerator, and therefore indirectly the Tokamak, to be operated continuously without interruption in the constant harmonic regime, i.e. in a regime where all the physical parameters that vary during operation of the refrigerator and the Tokamak have average values that are constant or substantially constant.

The invention also relates to a pulsed load refrigerator for cooling a component of a Tokamak, the refrigerator being equipped with a cooling device comprising a circuit forming a working cycle for a working fluid such as helium, the circuit of the cooling device comprising:

a station for compressing the working gas, the station being equipped with at least one compressor;

a precooling/cooling unit comprising at least one heat exchanger and at least one component for expanding the working gas output from the compressing station;

a system for exchanging heat between the cooled working fluid and the component; and a system for returning fluid that has exchanged heat with the component to the compressing station, the refrigerator comprising electronic logic for controlling the cooling device ensuring regulation of the cooling power produced by said cooling device, in order for this cooling power to be rapidly increased to a relatively high level when the Tokamak is in a plasma generation phase, the refrigerator being characterized in that the Tokamak comprises an emitter that emits a triggering signal each time a plasma is being started, the electronic logic comprising a receiver that receives said triggering signal so as to automatically request the increase in the cooling power produced by the cooling device on reception of this signal, and in that the electronic control logic is configured to selectively regulate the cooling power of the cooling device, using forced "periodic and symmetric" control, in response to said signal.

According to other possible features:

the refrigerator may comprise a sensor that measures the value of a physical parameter that can be observed in the Tokamak and that indicates whether a plasma is being struck, said sensor delivering a signal to the emitter with a view to providing the electronic control logic with input;

the sensor comprises at least one of: a sensor for sensing the internal or external temperature of the Tokamak; a switching sensor for sensing the manual or automatic command requesting the Tokamak switch from what is called a "standby" phase into a plasma generation phase; or any other electrical sensor present in the instrumentation of the Tokamak;

the precooling/cooling unit comprises: a buffer reserve of fluid liquefied during the working cycle; a heater that can be selectively activated so as to vaporize some of the liquefied fluid of the reserve; and a circuit for selectively exchanging heat between the fluid of the reserve and the component, the refrigerator comprising a sensor measuring the thermal load on the component, i.e. a sensor measuring the value of a quantity representative of the cooling requirement of the component to be cooled, the sensor measuring the thermal load on the component delivering a signal to the electronic control logic, said electronic control logic being programmed to decrease the cooling power produced by the cooling device to a relatively low level in response to a signal indicating a preset decrease in the thermal load on the component; and the sensor measuring the thermal load on the component comprises at least one of: a sensor for sensing temperature in a fluid circuit selectively ensuring heat exchange between the component and the working fluid; a pressure sensor; a means for measuring the electrical power supplied to the heaters; and a means for measuring the speed of cold compressors and/or turbines of the cooling device.

The invention may also concern any alternative device or method comprising any combination of the features described above or below.

The invention thus allows, for a Tokamak operating "periodically and symmetrically", for a Tokamak operating "periodically and symmetrically", the cooling power of the refrigerator to be automatically regulated, minimizing liquid helium consumption. As will be described below, the invention allows the overall power consumption of the refrigerator to be reduced. The invention especially allows the length of the period of use of the refrigerator at its maximum cooling power to be reduced.

The present invention is not restricted to strictly sinusoidal operating modes, but is applicable to any periodic regime which is similar thereto, i.e. that has high-power and low-power phases the durations of which are similar or equal. For example, the invention also applies to an operating mode in which the thermal load signal possibly resembles a square periodic waveform, a triangular periodic waveform or a half-sinusoidal periodic waveform, or any other periodic waveform.

BRIEF DESCRIPTION OF THE FIGURES

Other features and advantages will become apparent on reading the description below, given with reference to the figures in which.

DETAILED DESCRIPTION OF THE INVENTION

The general operating principle will now be described with reference to FIG. 1.

Figure 1:
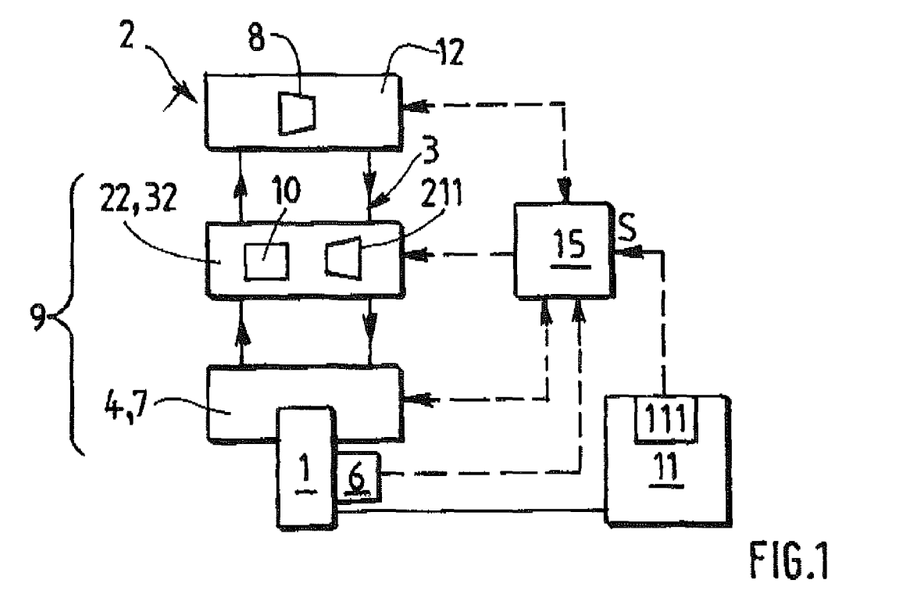
FIG. 1 is a partial schematic showing the structure and operation of a Tokamak refrigerator according to the invention.

The refrigerator schematized in FIG. 1 comprises, in the conventional way, a cooling device 2 comprising a circuit that subjects helium to a working cycle so as to produce a cooling effect.

The circuit of the cooling device 2 comprises a compressing station 12 equipped with at least one compressor 8, which compresses the helium. Once output from the compressing station 12, the helium enters a cooling unit 32 (optionally with a precooling unit 22). The cooling/precooling unit 22, 32 comprises one or more exchangers 10 that exchange heat with the helium so as to cool the latter.

The cooling/precooling unit 22, 32 comprises one or more turbines 211 for expanding the helium. Preferably, the cooling/precooling unit 22, 32 employs a Brayton cycle.

At least some of the helium is liquefied before being output from the cooling/precooling unit 22, 32 and a circuit 4, 7 is provided to ensure selective heat exchange between the liquid helium and a Tokomak component 1 to be cooled. The component 1 to be cooled for example comprises a generator of magnetic fields obtained using a superconducting magnet, and/or one or more cryopumps.

The heat exchange circuit 4, 7 may for example comprise a tank 4 storing a reserve of liquefied helium and ducts and one or more exchangers ensuring indirect heat exchange between the component 1 and the liquid helium.

At least some of the helium heated during heat exchange with the component 1 is returned to the compressing station. During the return to the compressing station 12, the helium may be used to cool exchangers 10, which in turn cool the helium output from the compressing station 12.

When a plasma is generated in the Tokamak 11, the component 1 is subjected to a higher thermal load (i.e. an increased cooling requirement). The cooling power of the cooling device 2 must therefore be increased.

The refrigerator possesses electronic logic 15 for controlling the cooling device 2, which especially allows the cooling power produced by said cooling device 2 to be regulated. In particular, the electronic logic 15 allows this cooling power to be rapidly increased to a relatively high level (for example to a level providing a maximum cooling effect) when the Tokamak 11 is in a plasma generation phase. Likewise, the electronic logic 15 controls the decrease of this cooling power to a relatively low level (for example to a preset minimum level) when the Tokamak 11 is no longer in a plasma generation phase.

The variation in the cooling power produced by the cooling device 2 is conventionally obtained by modifying the cycle pressure P, i.e. the pressure level (BP and/or MP and/or HP) of the compression 12 to which the helium is subjected during the working cycle.

The variation in the cooling power produced by the cooling device 2 may also be carried out, if required, by modifying the cycle flow rate, i.e. by modifying the flow rate of helium through the working cycle.

To meet the cooling requirement of a component 1 of a Tokamak generating plasmas periodically and symmetrically (especially in a harmonic regime that resembles a sinusoidal regime), the cooling power of the cooling device 2 is in turn regulated using forced "periodic and symmetric" control and the increase in the cooling power produced by the cooling device 2 is triggered in anticipation of the plasma, before the effect of the thermal load on the component 1 is observed. In addition, preferably, the variation in the cooling power produces increases and decreases in cooling power that are progressive and not all-or-nothing changes.

The increase in the cooling power is anticipated by way of, for example, a signal S produced during a step of striking a plasma in the Tokamak 11.

Thus, in contrast to the prior art, the increase in the cooling power of the device 2 of the refrigerator according to the invention is not triggered in response to information on the heating curve of a heater of the liquid helium reserve. On the contrary, this switch between a low-cooling-power operating mode and a high-cooling-power operating mode is automatic and anticipated relative to the relevant information on the heating curve of the heater.

Figure 2:
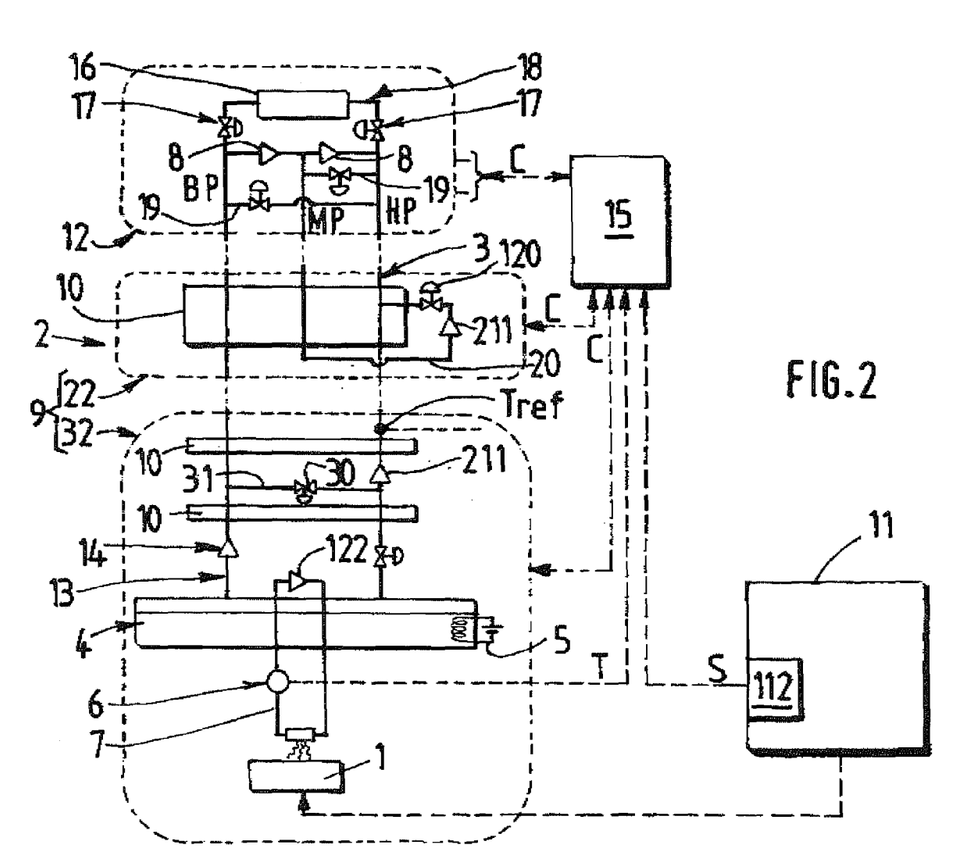
FIG. 2 is a partial schematic showing the structure and operation of a Tokamak refrigerator according to another exemplary embodiment of the invention.

In particular, in the refrigerator according to the invention, the Tokamak 11 comprises an emitter for emitting a signal S when a plasma is being struck (cf. FIG. 2). This signal S is sent (by wire or wirelessly) to the electronic logic 15. For this purpose, the electronic logic 15 may comprise a receiver for receiving said signal S. When this signal S is received, the electronic logic 15 automatically requests the increase in the cooling power produced by the cooling device 2.

The signal S indicating that a plasma is being struck in the Tokamak is for example based on a physical parameter than can be observed in or upstream of the Tokamak 11 (and not downstream of the Tokamak 11 as was the case in the prior art).

For example, and without this being limiting, the physical parameter monitored so as to detect when a plasma phase has started may comprise at least one of: a threshold value for the internal temperature of the Tokamak; an electrical control signal; a manual control signal from an operator starting the Tokamak, or any other equivalent means; and a pressure and/or current and/or voltage and/or magnetic field measurement.

This advantageous feature allows the beginning of the plasma generation phase to be detected and makes it possible to make use of the time constant of the transfer of the thermal load between the core of the Tokamak (plasma generation region) and the thermal interface of the refrigerator (component 1 to be cooled). In this way, the refrigerator takes into account the inertia of the system in order to anticipate the increased cooling requirement before its effect on the component 1 is observed.

Thus, by virtue of the invention, the change in the cooling power regime occurs in such a way that the maximum power of the refrigerator is immediately available when the increased thermal load appears.

This makes it possible to vary the pressures of the cycle slowly and smoothly, before the effect of the thermal load on a helium buffer bath is observed. This anticipation moreover makes it possible to optimize the power consumption of the refrigerator and to limit the amplitude of variations in the liquid helium level.

In the particular case of a harmonic regime, this anticipation also makes it possible to achieve a phase advance, which has a stabilizing effect and increases the robustness of the regulation. To compensate for the excess power produced by the refrigerator (the power produced by the refrigerator being deliberately increased before the effect of the thermal load is observed), one solution may consist in providing what is called a cold bypass system in the refrigerator.

A cold bypass 31 may thus optionally be provided downstream of the last turbine so as to selectively return directly or indirectly part of the helium from the cooling unit 22 to the compressing station 12. Such a system 30, 31 advantageously allows the pressures and flow rates of the cycle to be smoothed (cf. FIG. 2). This also allows the amplitude of temperature variations in the cooling unit 12 to be limited (an operating mode of such a cold bypass is described for example in document WO2009/024705). This solution makes it possible to do away with the nonnegligible power consumption of a heater, and to limit judiciously the amplitude of temperature variations in the cold unit.

Using the heater and/or a cold bypass makes it possible to use any excess cooling power to reduce the temperature of the heat exchangers of the cooling unit 32. This allows the flow rate through the turbines of the stages of the cooling unit 32 to be reduced.

FIG. 2 illustrates this operating mode for a nonlimiting exemplary refrigerator 2.

The compressing station 12 of the refrigerator in FIG. 2 comprises two compressors 8. The compressors for example define three pressure stages: a low pressure BP level (at the inlet of the compressing station 12), an intermediate pressure MP level (at the outlet of the first compressor 8) and a high pressure HP level (at the outlet of the second compressor 8).

As shown, the compressing station 12 may comprise a duct 18 for diverting liquid hydrogen to a buffer storage tank 16. A system of valves 17 allows the transfer of helium between the working circuit 3 and the buffer storage tank 16 to be regulated. Likewise, in the conventional way, ducts 19 equipped with respective valves may be provided so as to ensure selective return of compressed helium to certain compression stages.

After being output from the compressing station 12, the helium is admitted into a precooling unit 22 in which this helium is cooled via heat exchange with one or more exchangers 10 and optionally expanded in turbines 211.

A duct 20 equipped with a valve 120 may also be provided in order to selectively return helium from the precooling unit to the compressing station 12.

The high-pressure helium is then admitted into a cooling unit 32. The helium is cooled via heat exchange with one or more exchangers 10 and optionally expanded in one or more turbines 211.

As explained above, a cold bypass duct 31 equipped with a valve 30 may be provided to selectively return expanded helium to the compressing station 12.

The helium liquefied in the cooling unit is mainly stored in a reserve 4. This reserve 4 of liquid helium forms a cold reserve intended to exchange heat with the component 1 to be cooled. The cooling for example occurs via a closed-loop circuit 7 equipped with a pump 122.

The heated helium output from the reserve 4 is then returned to the compressing station 12 (for example via a duct 13 optionally equipped with a compressor 14).

During its return the helium may be used to cool the exchangers 10 of the cooling units 32 and the precooling units 22.

Electronic logic 15 (which may comprise a microprocessor) is connected to the compressing station 12 in order to regulate the cooling power (control signals C from the various components: valves, compressors, turbines, etc.). The electronic logic 15 is also connected to the cooling units 32 and the precooling units 22 (control signals C from the various components: valves, turbines, heaters, etc.). In particular the electronic logic 15 controls the heater 5 of the reserve 4 in order to regulate the liquid helium level in the latter.

According to the invention, the Tokamak 11 may comprise a sensor 111 that measures the value of a physical parameter that can be observed in the Tokamak 11 and that indicates when a plasma is being struck (cf. FIG. 1). Signals from the sensor are relayed by an emitter 112 to a receiver of the electronic logic 15.

Advantageously, a temperature T sensor 6 in the circuit 7 containing fluid flowing between the refrigerator and the component 1 also provides the electronic logic 15 with input. When the measured temperature T decreases (i.e. the cooling requirements decrease due to the plasma phase ending), the electronic logic 15 requests C that the cooling power setpoint be lowered. Of course, the end of the plasma phase may be detected by any other means, for example via the heating curve of the heater 5, via a parameter in the Tokamak, or via other observables internal to the refrigerator such as for example cold compressor or turbine speeds.

Specifically, if it is deliberately chosen not to regulate the speeds of the turbines, these speeds will naturally vary depending on the cooling required, and will therefore indicate the thermal load being applied to the liquid helium reserve 4.

These two parameters (signal S, indicating that a plasma phase is starting, and temperature, after the plasma phase) may be used in a feedforward control scheme, i.e. at least one of:
 the pressure setpoint curve in the working cycle;
 the control curve of the frequency of an optional cycle variator (for controlling the helium flow rate in the working circuit); and
 the degree to which the cold bypass 30 is open,
may be defined by a digital computer, for example integrated into the electronic logic 15. The digital computer may for example use a simple parameterizable arithmetic function or else an internal state prediction model to obtain finer regulation, with a view to optimizing power consumption.

When the signal indicating a plasma is being struck is received by the device 2, 15, the maximum pressure setpoint is given to the compressing station 12. At this instant, the cooling device 2 is still in its reduced operating mode, and the cold bypass valve 30 is open (the reference temperature Tref of the fluid upstream of the bypass increases).

The fact that the cold bypass is open limits the power of the refrigerator. The real pressure applied in the compressing station 12 and the resulting effects will depend on the digital control method used to regulate the compressing station. The regulation may use a predefined internal model, a "PID" control, or multivariable controls such as LQR controls, etc.

When the thermal load on the reserve 4 increases, the cold bypass valve 30 is closed. The temperature Tref of the bypass decreases so as to deliver maximum cooling power to the component 1.

Optimal regulation of the pressure is obtained. This results in a significant power saving.

Periodic and symmetric operation of the Tokamak 11, with plasmas applying a sinusoidal harmonic thermal load to the component 1 for example, will now be discussed.

The thermal load may be anticipated, i.e. the increases in the cooling power delivered by the refrigerator may be anticipated, using a periodic squarewave base signal.

This base signal may be used as an upstream setpoint, requesting the maximum and minimum pressures from the compressing station 12 (setpoints for the high pressure HP and/or intermediate pressure MP and/or low pressure BP, respectively). As seen above, the maximum pressure setpoint is requested by a signal S generated when a plasma is being struck. As described above, the minimum pressure may be requested in response to an observable internal to the refrigerator, such as, for example, a temperature, a pressure, a turbine speed or a cold centrifugal compressor speed.

Preferably, this anticipating squarewave setpoint (cf. signal CC FIG. 3) is not used directly because the changes that it would induce in the refrigerator settings (pressure, flow rate in the working cycle) would be too abrupt. Thus, according to the invention, the squarewave base control signal CC is converted into a progressive signal, for example a quasi-harmonic signal (cf. CH FIG. 3). For this purpose, a setpoint filter may be used to generate a progressive signal for controlling the refrigerator.

Figure 3:
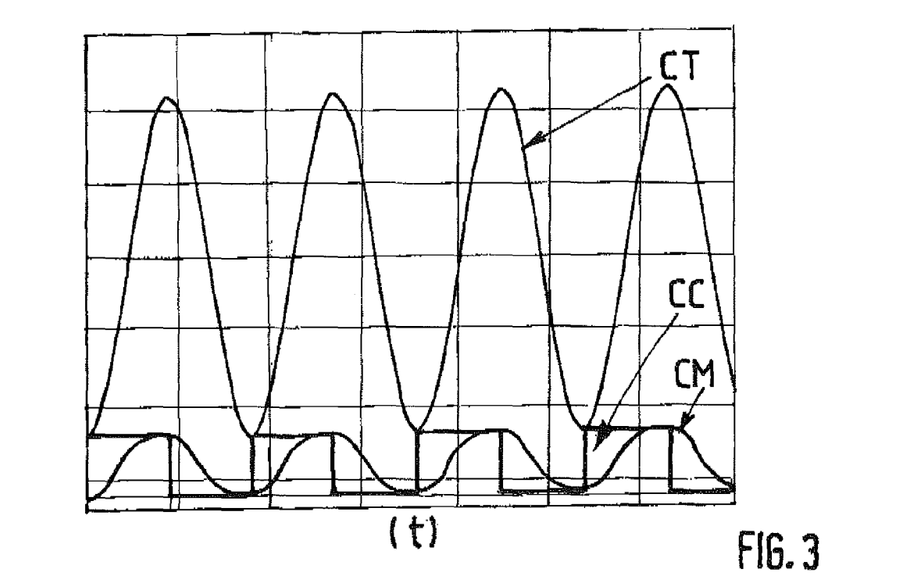
FIG. 3 shows, on the same graph, an exemplary sinusoidal variation, as a function of time, in the thermal load CT on a component of a Tokamak and two cycle pressure setpoint signals CC, CH—a square and harmonic waveform, respectively—of an associated refrigerator as a function of time (t).

For example, a 6th degree low-pass polynomial filter may convert this squarewave base signal CC to a quasi-sinusoidal control signal CH.

The time constant of this filter may be adjusted by the operator in order to match the phase difference of the pressure control with the thermal load on the component 1. For example, the pressures of the compressing station 12 may be brought into phase with the speed of the coldest turbine 211 of the cooling unit 32. In the harmonic regime it is important and even essential to ensure that the phase difference between the refrigerator setpoint control signal CH and the thermal load CT is correct if the pressure amplitude is to be effectively modulated.

FIG. 3 shows, for a nonlimiting example, the refrigerator cycle pressure control signal CH anticipating the thermal load CT. FIG. 3 also illustrates the forced periodic and symmetric nature of the progressive refrigerator cycle pressure control signal CH, i.e. FIG. 3 shows that the cooling power of the refrigerator is harmonically and progressively modulated in anticipation of the thermal load on the component 1 to be cooled.

When the phase difference has been set, the control logic 15 may request amplitude modulation of the pressures MP, HP, BP of the working cycle.

The average values of the high pressure HP and the intermediate pressure MP and of the cycle are parameters that are preferably adjusted by the operator.

The amplitude variation of the pressure around these respective average values is a parameter that is preferably automatically regulated by a regulator, for example provided for in the electronic logic 15.

This regulator may be a proportional integral derivative (PID) control.

The control may also be iterative via an adaptive control law such as a least mean square (LMS) law tailored to the monovariable processes in the harmonic regime.

The observable of this regulator may, for example, be the root mean square (RMS) value of the liquid helium level measured in the reserve 4.

Using the root mean square (RMS) value of the liquid helium level measured in the reserve 4 makes it possible to keep the liquid helium fill level at its initial value, without regulating the value of the level itself.

Nevertheless, the operator may choose to regulate the average value of the level rather than the RMS value. The operator must then interrupt the amplitude modulation, i.e. the amplitude variation must be kept constant and a second regulator used, this second regulator acting on the average value of the amplitude of the pressure and not on the amplitude variation.

Once the desired average value of the liquid helium level has been obtained, it is preferable to return to an amplitude modulation mode because this mode will not only allow this average liquid level to be kept constant, but will also allow the optimal amplitude of the level variation, minimizing the average power consumption of the refrigerator, to be determined.

The invention therefore combines various regulating, anticipating and modulating processes which allow the operator to minimize the power consumed by the refrigerator.

On account of the pressure amplitude deviations that the invention employs, it may prove to be necessary, to control the valves of the compressing station 12, to use a more effective control method that those conventionally employed with proportional integral derivative (PID) regulation.

One possible solution is to use linear quadratic regulator (LQR) control, which uses a number of variables. This control may associate both measurement of the pressures of the helium in the cycle 3 (regulated variables) and measurement of perturbations (helium flow rate in the BP and MP cycle) by exploiting the observables available internal to or in the refrigerator (such as pressures, temperatures, turbine speeds, cold compressor speeds, etc.).

The method according to the invention therefore does not consist in simply matching the cycle pressures to the cooling requirements. On the contrary, it consists of a deliberate decision to regulate the cycle pressures (especially HP and/or MP and optionally BP) in a forced, periodic and symmetric (harmonic, if required) regime. The pressure of the cycle of the refrigerator may be regulated using feedforward control logic (regulation of the pressure of the cycle of the refrigerator regulating the cooling power of the refrigerator)

One advantage of this method is that average values (for example RMS values) are used and not the instantaneous values of regulation observables. This makes the pressure amplitude modulation possible and allows methods suited to the harmonic regime to be used to optimize the power consumption of the refrigerator, by combining the advantages of anticipation and modulation.

The invention thus guarantees that the Tokamak can be operated continuously and without interruption while minimizing its power consumption.

The invention in particular allows the overall power consumption of the installation to be reduced, progressively over a series of plasmas, in particular when the Tokamak generates plasmas periodically and symmetrically, especially in a harmonic regime.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A pulsed load method for cooling a component of a Tokamak, the method employing a cooling device that subjects a working fluid to a working cycle comprising: compression; cooling and expansion; heat exchange with the component; and heating, the Tokamak comprising at least one operating mode called a "periodic and symmetric" operating mode in which plasmas of preset duration (Dp) are generated periodically with intervals of duration (Dnp) between two successive plasmas, the duration (Dnp) of the intervals being at most 30% different to the duration (Dp) of the plasmas (Dnp=Dp±30%), according to the method the cooling power produced by the cooling device is increased to a relatively high level when the Tokamak is in a plasma generation phase (Dp) whereas the cooling power produced by the cooling device is reduced to a relatively low level when the Tokamak is no longer in a plasma generation phase (Dnp), characterized in that during the "periodic and symmetric" operating mode of the Tokamak the cooling power produced by the cooling device is regulated using forced "periodic and symmetric" control wherein the durations of respective phases spent generating a high cooling level and generating a low level of cooling power differ by 30% at most, and in that the cooling power is varied so as to produce progressive increases and decreases in the cooling power, and in that the increase in the cooling power produced by the cooling device is triggered in anticipation of a plasma, in response to a signal (S) produced during a step of starting said plasma in the Tokamak, wherein the signal is produced before the thermal load on the component increases.

2. The method of claim 1, wherein the working cycle comprises stages in which the working fluid is respectively subjected to a high pressure (HP), an intermediate pressure (MP) and a low pressure (BP) and in that, during the periodic and symmetric operating phase of the Tokamak, at least one of: the high pressure level (HP); and the intermediate pressure level (MP) is regulated using forced "periodic and symmetric" control, i.e. the amplitude of the pressure (MP, HP) is regulated between respective higher and lower values for respective durations that differ by 30% at most.

3. The method of claim 2, wherein the high pressure level (HP) and/or the intermediate pressure level (MP) are/is regulated by modulating the amplitude of the pressure about a respective preset average pressure value.

4. The method of claim 3, wherein the modulation of the amplitude of the pressure is carried out automatically by electronic logic implementing at least one of:
　proportional integral derivative (PID) closed loop control;
　iterative control via an adaptive control law such as a least mean square (LMS) law; and
　linear quadratic regulator (LQR) control.

5. The method of claim 2, wherein the method comprises at least one period during which the cooling device liquefies the working fluid and stores the liquefied fluid in a buffer reserve with a view to using it to release cooling power during a plasma phase, and in that the high pressure (HP) level and/or the intermediate pressure (MP) and/or low pressure level is regulated as a function of the liquid level measured in the buffer reserve and/or as a function of the average value of this liquid level.

6. The method of claim 5, wherein the high pressure (HP) level and/or the intermediate pressure (MP) and/or low pressure level are/is regulated as a function of the root mean square (RMS) value of the liquid level measured in the buffer reserve.

7. The method of claim 5, wherein the high pressure (HP) level and/or the intermediate pressure (MP) and/or low pressure level are/is regulated as a function of the maximum measured value of the liquid level in the buffer reserve.

8. The method of claim 5, wherein the cooling power produced by the cooling device is regulated so as, on the one hand, to consume, during a plasma phase, the liquid in the buffer reserve, starting from a preset initial liquid level and, on the other hand, to restore to the reserve said initial liquid level between plasma phases.

9. The method of claim 5, wherein the cooling power of the cooling device is regulated so as to keep the average value of the liquid level in the reserve constant.

10. The method of claim 1, wherein the cooling power of the cooling device is regulated using a harmonic forced control.

11. The method of claim 1, wherein the cooling power produced by the cooling device is regulated by controlling the level of at least one cycle pressure of the working fluid in the working cycle and/or by regulating the rotation speed of compressors used in the working cycle, especially during the compression.

12. The method of claim 1, wherein the cooling power produced is regulated by directly or indirectly varying the electric power consumed by the cooling device.

13. A pulsed load refrigerator for cooling a component of a Tokamak, the refrigerator being equipped with a cooling device comprising a circuit forming a working cycle for a working fluid, the circuit of the cooling device comprising:
　a station for compressing the working gas, the station being equipped with at least one compressor;
　a precooling/cooling unit comprising at least one heat exchanger and at least one component for expanding the working gas output from the compressing station;
　a system for exchanging heat between the cooled working fluid and the component; and
　a system for returning fluid that has exchanged heat with the component to the compressing station,
the refrigerator comprising electronic logic for controlling the cooling device ensuring regulation of the cooling power produced by said cooling device, in order for this cooling power to be increased to a relatively high level when the Tokamak is in a plasma generation phase, the refrigerator being characterized in that the Tokamak comprises an emitter that emits a triggering signal (S) each time a plasma is being started, the electronic logic comprising a receiver that receives said triggering signal (S) so as to automatically request (C) the increase in the cooling power produced by the cooling device on reception of this signal (S), and in that the electronic control logic is configured to selectively regulate the cooling power of the cooling device, using forced "periodic and symmetric" control, in response to said signal (S) that is produced during a step of starting said plasma in the Tokamak and before the thermal load on the component increases.

14. The refrigerator of claim 13, wherein the electronic logic is configured so as to vary the cooling power produced by the device by controlling at least one cycle pressure of the working fluid in the working cycle and/or by controlling the rotation speed of compressors used in the working cycle.

15. The refrigerator of claim 13, wherein the electronic logic is configured to directly or indirectly regulate the electronic power consumed by the cooling device.

16. The refrigerator of claim 13, wherein the electronic logic is configured so as to vary the cooling power produced by the device by controlling at least one cycle pressure of the working fluid in the working cycle and/or by controlling the rotation speed of compressors used in the working cycle during the compression.

\* \* \* \* \*